United States Patent [19]

le Squin et al.

[11] Patent Number: 4,987,297

[45] Date of Patent: Jan. 22, 1991

[54] METHOD AND APPARATUS FOR AUTOMATICALLY READING A MECHANICAL FLUID METER

[75] Inventors: Guy le Squin, Chalon/Saone; Dominique Laurent, Torcy, both of France

[73] Assignee: Gaz De France, Paris, France

[21] Appl. No.: 323,426

[22] Filed: Mar. 14, 1989

[30] Foreign Application Priority Data

Mar. 14, 1988 [FR] France .................. 88 03296

[51] Int. Cl.$^5$ .................................. H01J 40/14
[52] U.S. Cl. ........................ 250/227.21; 250/231.14
[58] Field of Search .......... 250/227, 231 SE, 237 G, 250/227.21; 377/53; 356/73.1

[56] References Cited

U.S. PATENT DOCUMENTS

| | | | |
|---|---|---|---|
| 4,320,394 | 3/1982 | John, Jr. .................. | 250/231 R |
| 4,606,632 | 8/1986 | Hillerich .................. | 356/73.1 |
| 4,680,704 | 7/1987 | Konicek et al. .......... | 250/231 SE |
| 4,745,293 | 5/1988 | Christensen ............. | 250/227 |
| 4,767,164 | 8/1988 | Yeung ..................... | 250/227 |
| 4,772,800 | 9/1988 | Kanai et al. ............. | 377/53 |

FOREIGN PATENT DOCUMENTS 1574037  7/1981  Fed. Rep. of Germany .
58-155770  7/1985  Japan .
58-176829  8/1985  Japan .

*Primary Examiner*—Davis L. Willis
*Assistant Examiner*—Que Tan Le
*Attorney, Agent, or Firm*—Bryan, Cave, McPheeters & McRoberts

[57] ABSTRACT

The apparatus includes at least one light-reflecting element (11) disposed on a portion of at least one of the conventional rotary elements (10) of the mechanism of a mechanical fluid meter. The apparatus further includes a light-emitting circuit (130) and a light-detecting and converting circuit (140) with first and second concentric fibers (21, 22) providing an optical connection between the circuits and the meter. The electrical signal delivered by the conversion circuit (140) is amplified and the amplified electrical signal is compared with first and second thresholds (S1, S2). An alarm and indicator circuit is responsive to the comparison made with the first threshold (S1), and a circuit (190) counts and stores the pulses delivered after comparison with the second threshold (S2).

12 Claims, 3 Drawing Sheets

METHOD AND APPARATUS FOR AUTOMATICALLY READING A MECHANICAL FLUID METER

The present invention relates to a method and an apparatus for automatically reading a mechanical fluid meter fitted with graduated rotary wheels or disks.

BACKGROUND OF THE INVENTION mechanical fluid meters, e.g. gas meters or water meters, for metering fluid consumption and providing a reading of total consumption are used very widely.

These meters are normally read manually, which is expensive and not very practical given that the meter reader must periodically visit each user in order to read the meter. This takes up a great deal of time. In addition, since meters are not usually accessible from outside a home or other building, meters can normally only be read when the user is present.

It would also be very expensive to scrap all existing mechanical or electromechanical fluid meters and replace them with meters of some other type, since the existing meters are normally apparatus having long lifetimes.

In addition, it is often desirable for safety reasons, particularly when the metered fluid is a combustible gas, to avoid having electrical circuits in the immediate vicinity of the meter, and in this respect mechanical meters are completely safe.

The present invention seeks to remedy the above-mentioned drawbacks and to make it possible to read a mechanical fluid meter automatically and remotely while requiring a minimum of modifications to the structure of the meter.

SUMMARY OF THE INVENTION

These objects are achieved by a method of remotely and automatically reading a mechanical fluid meter having graduated rotary elements, the method consisting in fitting at least a portion of one of the conventional rotary elements of the meter mechanism with a localized light-reflecting element, in transmitting a light beam via a first optical fiber having an outlet end facing said portion of said rotary element, in using a second optical fiber having an inlet end in the vicinity of said rotary element in a zone adjacent to the outlet end of the first optical fiber to pick up the light reflected by said rotary element, in detecting light delivered by said second optical fiber at an outlet end thereof, in converting said detected light into an electrical signal, in amplifying said electrical signal, in comparing said electrical signal both with a low level first threshold corresponding to a minimum amount of light being received, and with a high level second threshold corresponding to receiving an amount of light which is greater than the amount which corresponds to normal reflection from said conventional rotary element, but less than the amount which corresponds to reflection by said reflecting element, in triggering an alarm corresponding to a failure of the meter-reading system should the electrical signal go below the first threshold, in delivering a pulse each time the electrical signal exceeds the second threshold, in counting the pulses delivered each time the second threshold is exceeded, and in recording the count in a memory, thereby making it possible for digitally counted information provided by the mechanical fluid meter to be read remotely and automatically at any time.

Advantageously, the first optical fiber is disposed concentrically around the second optical fiber.

The invention also provides apparatus for automatically reading a mechanical fluid meter having graduated rotary elements, the apparatus comprising at least one light-reflecting element disposed on a portion of at least one of the conventional rotary elements of the meter mechanism, a light-emitting circuit, a light-detecting circuit, an outer first optical fiber disposed concentrically around an inner second optical fiber in such a manner that the inlet to the outer first optical fiber is disposed in the vicinity of the light-emitting circuit, with the outlet of the inner second optical fiber being disposed in the vicinity of the light-detecting circuit, and with the outlet of the first optical fiber and the inlet of the second optical fiber being disposed to face said reflecting element, a converter circuit for converting the light beam applied to the light detecting circuit into an electrical signal, an amplifier for receiving the electrical signal from the converter circuit, a first comparator circuit for comparing the amplified electrical signal with a first threshold, a second comparator circuit for comparing the amplified electrical signal with a second threshold, an alarm or indicator circuit connected to the output of the first comparator circuit, and a circuit for counting and memorizing the pulses delivered by the second comparator circuit.

The light-emitting circuit may comprise a light-emitting diode emitting in the near infrared.

The light-detecting circuit and the converter circuit may be constituted by a common device such as a photodiode or a phototransistor.

The apparatus of the invention may be applied to a gaseous fluid meter and the electronic circuits disposed in the vicinity of the inlet to the first optical fiber and in the vicinity of the outlet from the second optical fiber are incorporated in a remotely-readable electronic meter, such as an electricity meter.

BRIEF DESCRIPTION OF THE DRAWINGS

Embodiments of the invention are described by way of example with reference to the accompanying drawings, in which:

In FIG. 1, block 1 symbolizes a fluid meter which is fitted in conventional manner with a mechanical-action meter system comprising a plurality of graduated rotary disks or wheels for displaying the value of the measured magnitude.

DETAILED DESCRIPTION

Figure 1:
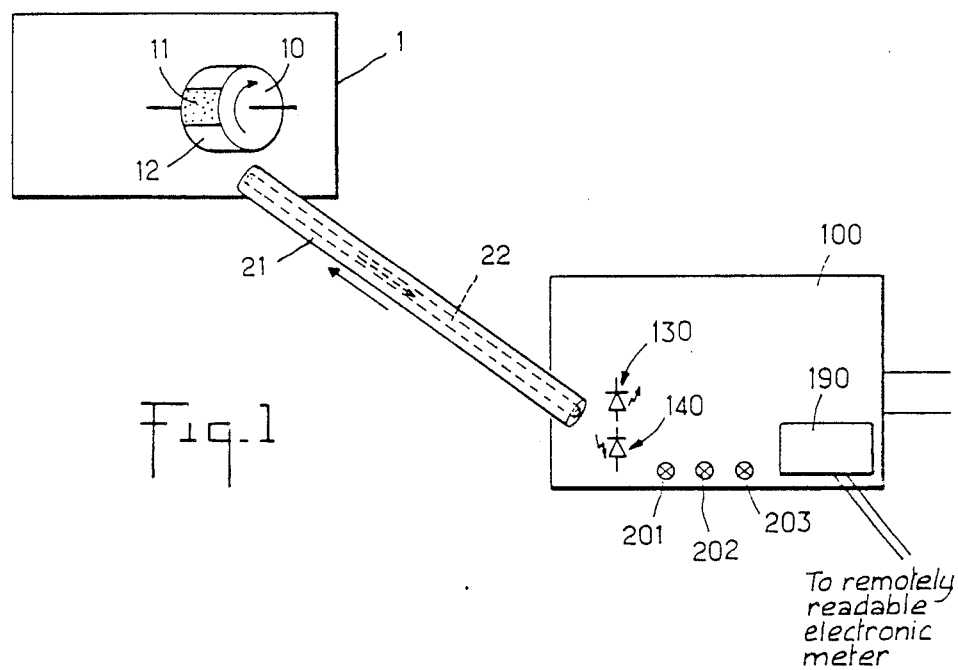
FIG. 1 is a diagram of the main component parts of apparatus in accordance with the invention.

FIG. 1 shows a mechanism having wheels and reference 10 designates a rotary wheel whose "tread" or edge 12 is provided, in accordance with the invention, with at least one reflecting element 11 covering a localized zone of its circumference. The reflecting element 11 may be constituted by a mirror glued to the "tread" 12 of the wheel 10, or simply by an adhesive pellet applied to the "tread" 12 of the wheel 10 and made of a flexible or semi-rigid substance which is colored so as to have high reflecting power.

As can be seen in FIG. 1, two coaxial optical fibers 21 and 22 which may be several meters long are disposed between the meter 1 and an electronic meter block 100 which contains electronic circuits for automatically transforming the data provided by the fluid meter 11 into digital values. The electronic meter block 100 includes a memory 190 which stores digital values representative of the fluid-consumption information displayed in traditional manner by the wheels 10 of the mechanism in the meter 1. The meter block 100 may advantageously be integrated in a remotely-readable electronic meter for providing information concerning the measurement of some other magnitude, e.g. concerning electricity consumption. In this case, the block 100 is incorporated in the remotely-readable electronic meter or is situated in the immediate vicinity thereof, and it is then possible to read the consumption information metered by the remotely-readable electronic meter automatically while simultaneously reading the information concerning fluid consumption as measured by the mechanical fluid meter and converted by the apparatus of the invention into digital values which are stored in the memory 190.

In the embodiment shown in FIG. 1, information from such a mechanical meter can be conveyed to a distance without including any electrical or electronic circuits in the immediate vicinity of the fluid meter, by making use of digital conversion, and while avoiding any kind of metallic coupling.

As mentioned above, the connection between the meter block 100 and the fluid meter 1 is provided by means of a system comprising two concentric fibers 21 and 22 which perform three functions, namely: illuminating a defined zone of a rotary element 10 in the meter, which zone is situated on the path of the reflecting element 11 when the rotary element 10 rotates; checking integrity of the optical fibers; and detecting the passage of the reflecting element 11 through the said zone which is illuminated by the fibers, thereby making it possible to count the resulting pulses and thus deduce digital information representative of the information displayed by the fluid meter.

The inlet to the outer fiber 21 is coupled to a light-emitting circuit 130 which may include a light-emitting diode (LED) 131 emitting light situated in the near infrared with a wavelength of about 660 nm, for example. The outlet of the outer fiber 21 faces the "tread" 12 of a wheel 10 in the mechanism of the meter 1.

The inner optical fiber 22 acts as a detector fiber and its inlet end situated level with the outlet of the outer optical fiber 21, i.e. looking at the "tread" 12 of the wheel 10, receives a reflected portion of the red or infrared light applied to the target by the outer optical fiber 21. The outlet of the inner optical fiber 22 is situated in the vicinity of the inlet to the outer optical fiber 21 and is coupled to a light receiving and converting circuit 140 which transforms the return light delivered by the inner optical fiber 22 into an electrical signal. The light receiving and converting circuit 140 may include a photocell, or preferably a photodiode 141.

When both optical fibers 21 and 22 are working properly, i.e. when neither of them is interrupted, a portion of the light transmitted by the outer fiber 21 is applied to the target (i.e. a localized zone of the "tread" 12 of the wheel 10) and is reflected by said target to be transmitted by the inner optical fiber 22 to the receiver and converter circuit 140 which thus delivers an electrical signal that is greater than a first electrical threshold S1, which is relatively low, but not zero. If either of the fibers 21 or 22 is accidentally cut or damaged, no light beam returns to the receiver and converter circuit 140 so the electrical signal output by the converter 140 is zero, and this serves to trigger an alarm indicating the presence of a fault. In contrast, if the reflecting element 11 passes through the zone that is illuminated by the outer optical fiber 21, then the inner fiber 22 receives a reflected light beam of increased intensity such that the converter 140 delivers an electrical signal of much greater magnitude than it does when the portion of the "tread" 12 of the wheel 10 facing the fiber 21 and 22 does not include the reflecting element 11. As a result the converter 140 delivers an electrical signal at a level which is greater than a second electrical threshold S2 which is in turn greater than the first threshold S1.

By a suitable choice of the two thresholds S1 and S2 relative to which the level of the electrical signals provided by the converter 140 is compared, it is possible to combine a function of monitoring the integrity of the optical fibers effectively with a function of detecting the passage of a reflecting element 11, while still making use of only two optical fibers 21 and 22. By using two optical fibers which are concentric with the outer fiber 21 being used for the purpose of illuminating a localized zone of the target, and the smaller diameter inner fiber 22 being used as the detector fiber, it is possible to guarantee a high degree of detection accuracy.

It may be observed that the optical fibers 21 and 22 may be made of plastic material so long as the go-and-return path of the light does not exceed a few meters, and providing the light source 131 is constituted by an LED operating in the near infrared. In this case, loss due to the fibers remains relatively limited, about 0.3 dB to 0.4 dB per meter. By using optical fibers made of plastic, it is possible to provide apparatus which is relatively cheap.

Figure 4:
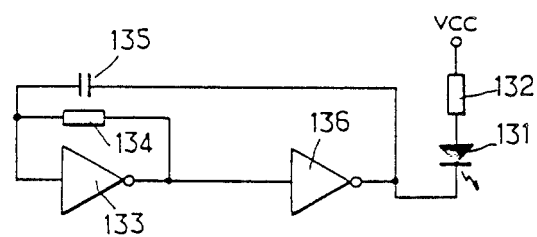
FIG. 4 is an electronic circuit diagram of a first particular embodiment of a light-emitting circuit usable in the FIG. 1 apparatus.
Figure 6:
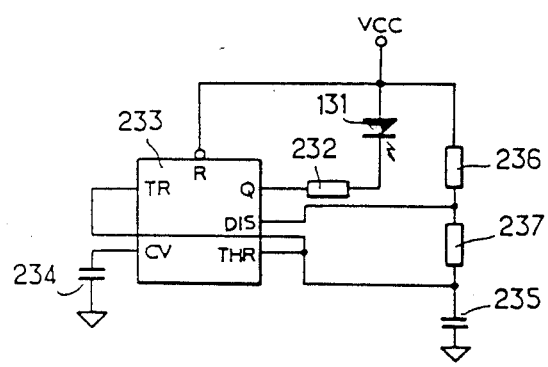
FIG. 6 is an electronic circuit diagram of a second particular embodiment of a light-emitting circuit usable in the FIG. 1 apparatus.

The light-emitting circuit 130 coupled to the outer fiber 21 and disposed in the meter block 100 advantageously includes an LED 131 connected to the fiber 21 and connected in series with a resistor 132 or 232 (FIGS. 4 and 6).

The LED 131 could be powered at constant current, which can be done very simply, however, given the characteristics of LEDs that implies using relatively low power in order to avoid shortening the lifetime of the LED 131.

In other embodiments the LED 131 is fed with current pulses at peak power, and two possible circuits are shown in FIGS. 4 and 6. To do this, the light-emitting circuit must include a modulator for modulating the current applied to the LED 131.

Since the peak power injected in the optical fiber is a linear function of the current flowing through the LED, it is advantageous to use a current modulator which allows peak power to be used during transmission while nevertheless operating at low power feed and dissipating little heat.

Figure 5:
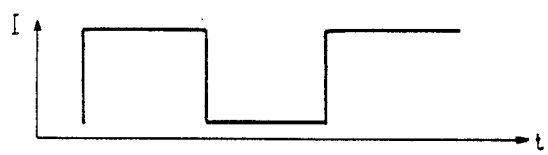
FIG. 5 shows the form of the modulation of the signal applied to the light-emitting device in the FIG. 4 circuit.

The circuit shown in FIG. 4 shows a modulator implemented using TTL logic circuits and having a duty ratio of 0.5 (see the waveform of FIG. 5 which shows the feed current through the LED 131 as a function of time). This cheap circuit comprises two inverter gates 133 and 136 connected in series, a capacitor connected between the input of inverter gate 133 and the output of inverter gate 136, and a resistor 134 connected between the input and the output of inverter gate 133. In this implementation, the peak power is only twice the mean power.

Figure 7:
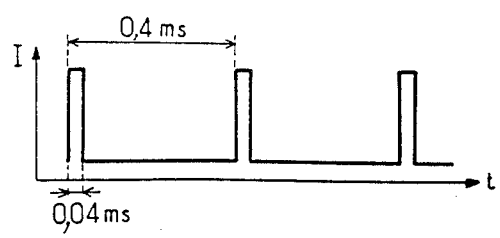
FIG. 7 shows the form of the modulation of the signal applied to the light-emitting device in the FIG. 6 circuit.

The circuit in FIG. 6 shows a modulator making use of an electronic timer in order to impart a duty ratio of 0.1, for example (as shown by the waveform of FIG. 7 which is a plot of the feed current to the LED 131 as a function of time). By selecting a duty ratio of 0.1, it is possible to use a peak power which is ten times greater than the mean power. This makes it possible to use maximum light-emission power without reducing the lifetime of the LED. The circuit for obtaining the modulation is based on an integrated circuit 233 in association with a small number of discrete components (capacitors 234 and 235, resistors 236 and 237) and is particularly simple.

Naturally, when the light-emitting circuit 130 modulates the light beam, the associated receiver circuit in the receiver and converter 140 must take appropriate account of the modulation when analyzing the modulation of the received signal. However, this is a conventional procedure, and the following description relates only to the case where the signals are not modulated.

Figure 2:
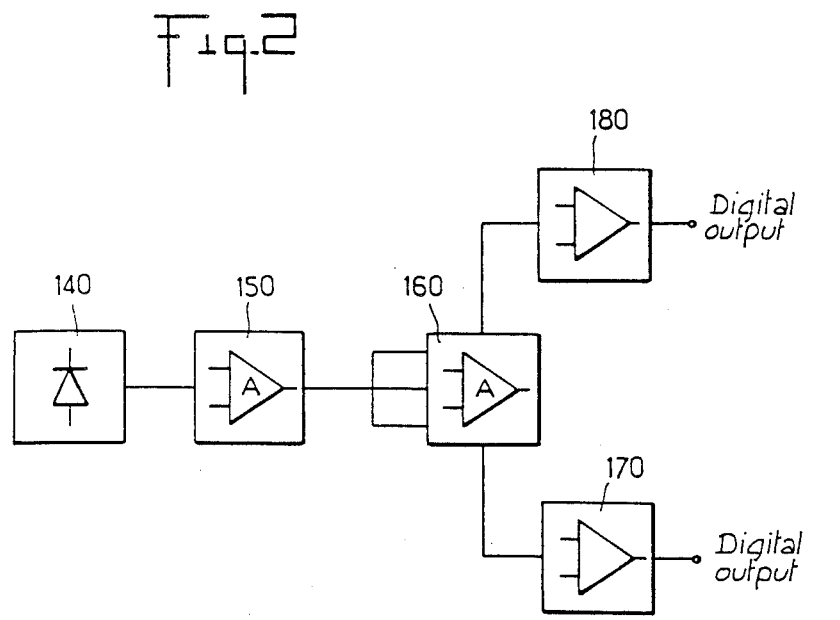
FIG. 2 is a block diagram showing the main functional subassemblies of a portion of the electronic circuit in the apparatus of FIG. 1.

FIG. 2 is a block diagram showing the main functional modules of the electronic circuits for processing the electrical signals representative of the return light beam conveyed by the inner optical fiber 22.

The module 140 comprises the receiver and converter stage coupled to the optical fiber 22 and it delivers an electrical signal to an amplifier stage 150 followed by a follower stage 160 for providing overall adjustment of the sensitivity of the apparatus as a function of the length of its optical fibers. The signals from the follower stage 160 are applied simultaneously to two comparators 170 and 180 for making comparisons simultaneously with two thresholds S1 and S2 at different levels, and for delivering digital signals representative respectively of the integrity or otherwise of the optical fibers 21 and 22, and of the detection or otherwise of the reflecting elements 11 on the wheel 10 of the meter 1.

Figure 3:
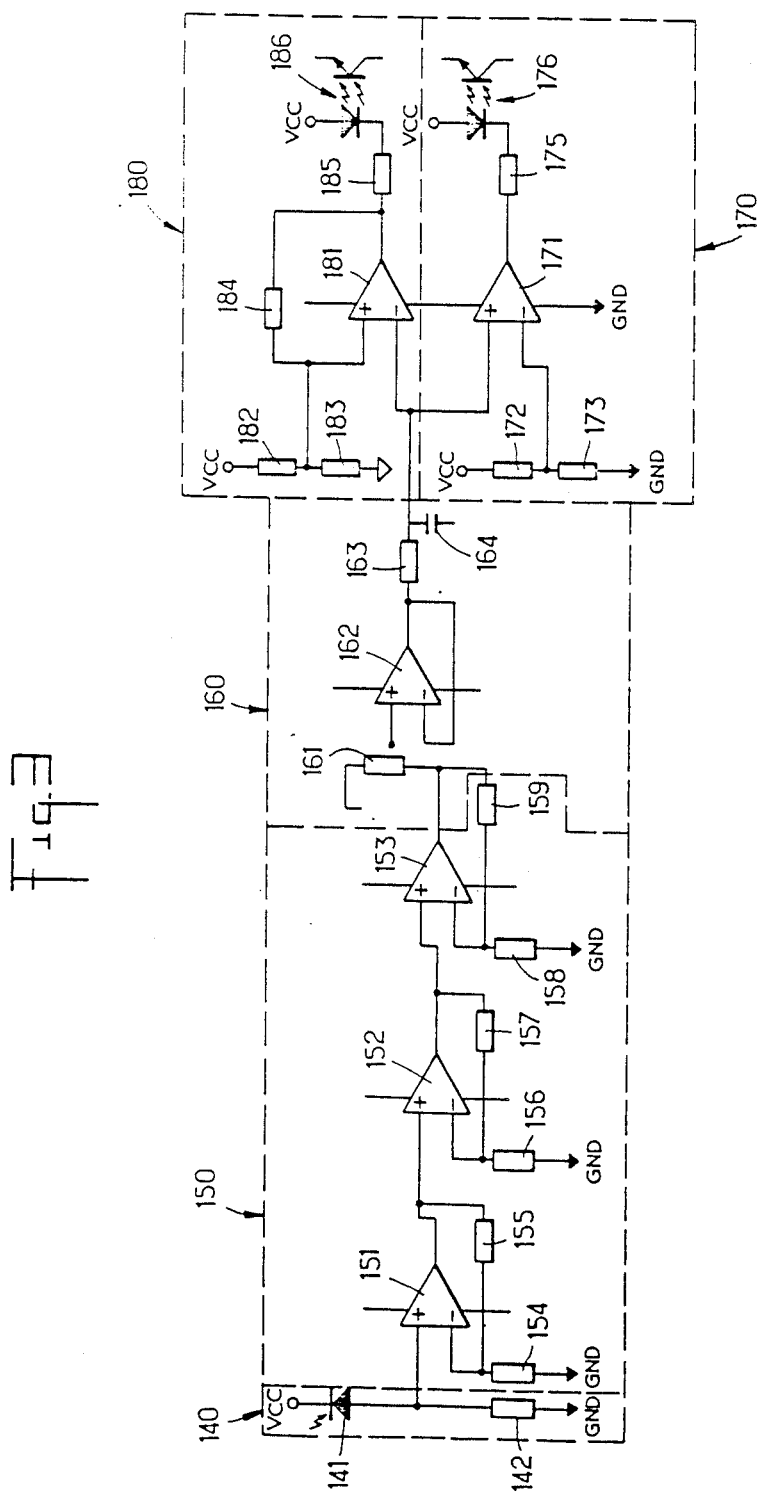
FIG. 3 is an electronic circuit diagram of a particular embodiment of the elements shown in FIG. 2.

FIG. 3 is a circuit diagram of a particular embodiment of the circuit shown in block form in FIG. 2.

In FIG. 3, the light-receiving device 141 for converting light into an electrical signal is constituted by a photodiode which operates in photovoltaic mode and changes the voltage across the terminals of a high-resistance load resistor 142.

The resulting small variations in input voltage are amplified by a three-stage amplifier 150 which may be conventionally constituted by a single integrated circuit comprising three operational amplifiers 151, 152, and 153 together with bias and feedback resistors 154 to 159.

The amplifier 150 feeds a potentiometer 161 for performing sensitivity adjustment, followed by an impedance-matching stage comprising an operational amplifier 162 connected as a follower, which is in turn followed by an RC circuit constituted by a resistor 163 and a capacitor 164 constituting a low-pass filter.

The output from the impedance matching stage 160 is constituted by the common point where the resistor 163 is connected to the capacitor 164, and this output is connected to the two comparator circuits 170 and 180 for comparing the level of the signal delivered by the impedance-matching stage 160 respectively with a low threshold S1 and with a high threshold S2 in order to deliver output information relating respectively to the integrity of the optical fibers and to the presence or absence of a reflecting element 11 facing the optical fibers.

The comparator circuit 170 comprises an operational amplifier 171 whose inverting input receives a signal whose level is set by a voltage-dividing bridge 172, 173 and determines the low threshold S1. The output from the stage 160 is connected to the non-inverting input of the operational amplifier 171. When the signal applied to the non-inverting input becomes less than the level of the low threshold S1, then the output of the operational amplifier 171 which is connected via a resistor 175 to the cathode of the diode in a photocoupler 76 activates said photocoupler which in turn delivers an alarm signal indicating that one or other of the optical fibers is interrupted.

Similarly, the comparator circuit 180 comprises an operational amplifier 181 whose non-inverting input receives a signal whose level, as fixed by a divider bridge 182, 183 determines the high threshold S2. The output from the stage 160 is connected to the inverting input of the operational amplifier 181. This operational amplifier also has a resistor 184 connecting its output to its non-inverting input. When the signal applied to the inverting input of the operational amplifier 181 exceeds the level of the high threshold S2 because a reflecting element 11 is going past the optical fibers 21 and 22, then the output of the operational amplifier 181 which is connected by a resistor 185 to the cathode of a diode in a photocoupler 186, activates said photocoupler which in turn delivers a pulse signal which is applied to a counter and storage circuit 190 (see FIG. 1).

The signals delivered by the photocouplers 176 and 186 are digital signals and are therefore suitable for automatic counting, storage, and remote reading.

It may be observed that the electronic circuits of the apparatus of the invention may be powered by a conventional power supply comprising a transformer, a rectifier bridge, filter capacitors, and an integrated regulator. However, given the low power requirements of the circuit, and given that the output photocouplers 176 and 186 provide isolation, it is also possible to use a direct power feed using specialized integrated circuits, e.g. the MAX600 type power supply circuit sold by the U.S. corporation Maxim Integrated Products.

The counting and alarm circuits connected to the outputs of the two comparator circuits 170 and 180 may include, for example, indicator lamps for indicating the state of the apparatus.

Thus, when setting up the apparatus, the sensitivity adjusting potentiometer 161 is adjusted as a function of the length of the optical fibers 21 and 22 so as to fix the low threshold S1 corresponding to the poor reflection of light by that portion of the "tread" 12 on the wheel 10 which is not provided with an adhesive reflecting element. So long as the signal delivered to the comparators 170 and 180 lies between the thresholds S1 and S2, an indicator lamp 202, e.g. an orange lamp, remains on (FIG. 1). When the signal delivered to the comparators 170 and 180 exceeds the high threshold S2 by virtue of a reflecting element 11 going past the optical fibers 21 and 22, then another indicator lamp 201, e.g. a green lamp, is switched on indicating that an output pulse has been recorded and counted and stored in the memory 190. Should either of the fibers 21 or 22 be interrupted while the apparatus is in operation, then a third indicator lamp 203, e.g. a red lamp, is switched on in order to indicate that the signal applied to the comparators 170 and 180 has gone below the low threshold S1 and that an alarm signal is present on the output photocoupler 176 of the comparator circuit 170. The circuits used for controlling the indicator lamps 201, 202, and 203 on the basis of the signals provided by the photocouplers 176 and 186 may be entirely conventional and may be constituted using logic gates.

Naturally, the electronic circuits described with reference to FIGS. 3, 4, and 6 are given purely by way of example, and other implementations are possible. In particular, most of the circuit components in FIG. 3 could be provided in the form of a single integrated circuit. Also, the light receiving and converting circuit 140 could include a phototransistor instead of a photodiode.

What is claimed is:

1. A method of remotely and automatically reading a mechanical fluid meter having graduated rotary elements, the method: comprising the steps of
   fitting at least a portion of one of said rotary elements of said meter with a localized light-reflecting element;
   transmitting a light beam via a first optical fiber having an outlet end facing said portion of said rotary element;
   using a second optical fiber having an inlet end in the vicinity of said rotary element in a zone adjacent to the outlet end of said first optical fiber to pick up light reflected by said rotary element;
   detecting light delivered by said second optical fiber at an outlet end thereof;
   converting said detected light into an electrical signal;
   amplifying said electrical signal;
   comparing said electrical signal both with a low level first threshold corresponding to a minimum amount of light being received, and with a high level second threshold corresponding to receiving an amount of light which is greater than the amount which corresponds to normal reflection from said rotary element, but less than the amount which corresponds to reflection by said reflecting element;
   triggering an alarm should the electrical signal go below the first threshold;
   delivering a pulse each time the electrical signal exceeds the second threshold;
   counting the pulses delivered each time the second threshold is exceeded; and
   recording said counting in a memory, thereby making it possible for digitally counted information provided by said mechanical fluid meter to be read remotely and automatically at any time.

2. A method according to claim 1, wherein the first optical fiber is disposed concentrically around the second optical fiber.

3. A method according to claim 1, wherein the light beam applied to the first optical fiber has a wavelength lying in the near infrared or in the red.

4. Apparatus for automatically reading a mechanical fluid meter having graduated rotary elements, the apparatus comprising:
   at least one light-reflecting element disposed on a portion of at least one of the rotary elements of the meter;
   a light-emitting circuit;
   a light-detecting circuit;
   a pair of optical fibers comprising an outer first optical fiber disposed concentrically around an inner second optical fiber is disposed in the vicinity of the light-emitting circuit, with the outlet of the inner second optical fiber being disposed in the vicinity of the light-detecting circuit, and with the outlet of the first optical fiber and the inlet of the second optical fiber being disposed to face said reflecting element;
   a converter circuit for converting the light beam applied to the light detecting circuit into an electrical signal;
   an amplifier for receiving the electrical signal from the converter circuit;
   a first comparator circuit for comparing the amplified electrical signal with a first threshold corresponding to a minimum amount of light being received;
   a second comparator circuit for comparing the amplified electrical signal with a second threshold and for delivering a pulse each time the electrical signal exceeds said second threshold, said second threshold corresponding to receiving an amount of light which is greater than the amount which corresponds to normal reflection from said rotary element;
   an alarm indicator circuit connected to the output of the first comparator circuit for providing an alarm should the amplified electrical signal go below said first threshold; and
   a circuit for counting and memorizing the pulses delivered by the second comparator circuit.

5. Apparatus according to claim 4, wherein the light-emitting circuit includes a light-emitting diode.

6. Apparatus according to claim 5, wherein the light-emitting diode emits in the red with a wavelength of about 660 nm.

7. Apparatus according to claim 4, wherein the light-detecting circuit and the converting circuit are constituted by a common device such as a photodiode or a phototransistor.

8. Apparatus according to claim 4, wherein the first and second coaxial optical fibers are made of a plastic material.

9. Apparatus according to claim 4, further comprising adjusting the sensitivity of the electronic circuits for processing the electrical signals delivered by the converter circuit.

10. Apparatus according to claim 4, wherein the light-emitting circuit includes means for modulating the emitted light beam.

11. Apparatus according to claim 4, applied to a gaseous fluid meter and wherein the electronic circuits disposed in the vicinity of the inlet to the first optical fiber and in the vicinity of the outlet from the second optical fiber are incorporated in a remotely-readable electronic meter, such as an electricity meter.

12. Apparatus according to claim 4, wherein the rotary elements of the gaseous fluid meter are constituted by wheels and the reflecting element is disposed on the "tread" of one of the wheels.

* * * * *

UNITED STATES PATENT AND TRADEMARK OFFICE
CERTIFICATE OF CORRECTION

PATENT NO. : 4,987,297

DATED : January 22, 1991

INVENTOR(S) : GUY LE SQUIN AND DOMINIQUE LAURENT

It is certified that error appears in the above-identified patent and that said Letters Patent is hereby corrected as shown below:

Column 1, line 11: Change "mechanical" to --Mechanical--.

Column 2, line 47: Page 2, line 1 of Preliminary Amendment. After "parts of" insert --an--.

Signed and Sealed this

Sixth Day of October, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 4,987,297

DATED : January 22, 1991

INVENTOR(S) : Guy LE SQUIN and DOMINIQUE Laurent

It is certified that error appears in the above-identified patent and that said Letters Patent is hereby corrected as shown below:

Column 7, line 31, change "method: comprising the steps of" to

--method comprising the steps of--.

Signed and Sealed this

Twenty-second Day of December, 1992

*Attest:*

DOUGLAS B. COMER

*Attesting Officer*     *Acting Commissioner of Patents and Trademarks*